United States Patent
Sahlgren et al.

(10) Patent No.: US 8,218,922 B2
(45) Date of Patent: Jul. 10, 2012

(54) CHANNELIZED DISPERSION COMPENSATION MODULE

(75) Inventors: Bengt Sahlgren, Saltsjö-Boo (SE); Sten Helmfrid, Kista (SE)

(73) Assignee: Proximion Fiber Systems AB, Kista (SE)

( * ) Notice: Subject to any disclaimer, the term of this patent is extended or adjusted under 35 U.S.C. 154(b) by 455 days.

(21) Appl. No.: 12/527,810

(22) PCT Filed: Feb. 15, 2008

(86) PCT No.: PCT/EP2008/001163
§ 371 (c)(1),
(2), (4) Date: Oct. 13, 2009

(87) PCT Pub. No.: WO2008/101636
PCT Pub. Date: Aug. 28, 2008

(65) Prior Publication Data
US 2010/0080499 A1    Apr. 1, 2010

(30) Foreign Application Priority Data
Feb. 20, 2007   (EP) ................... 07102752

(51) Int. Cl.
*G02B 6/00* (2006.01)
*G02B 6/02* (2006.01)
*G02B 6/34* (2006.01)
(52) U.S. Cl. ........................ 385/37; 365/123
(58) Field of Classification Search ............ 385/27, 385/28, 34, 37, 147, 129, 24, 39, 31, 17, 385/12, 50; 359/111, 161, 341.1, 572, 885; 398/81; 372/20, 29.01, 29.02, 32
See application file for complete search history.

(56) References Cited

U.S. PATENT DOCUMENTS

| | | | | |
|---|---|---|---|---|
| 6,072,927 A * | 6/2000 | Iwashima et al. | ................ | 385/37 |
| 6,081,640 A * | 6/2000 | Ouellette et al. | ................ | 385/37 |
| 6,304,696 B1 * | 10/2001 | Patterson et al. | ................ | 385/37 |
| 6,643,429 B2 * | 11/2003 | Robinson et al. | ................ | 385/37 |
| 6,707,967 B2 * | 3/2004 | Rothenberg et al. | ............ | 385/37 |
| 6,865,319 B2 * | 3/2005 | Painchaud | ........................ | 385/37 |
| 6,947,641 B2 * | 9/2005 | Durkin et al. | ................... | 385/37 |

(Continued)

FOREIGN PATENT DOCUMENTS
EP  1 265 086 A2  12/2002
(Continued)

OTHER PUBLICATIONS

Kai-Ping Chuang et al., "Pure Apodized Phase-Shifted Fiber Bragg Gratings Fabricated by a Two-Beam Interferometer With Polarization Control", IEEE Photonics Technology Letters, vol. 16, No. 3, Mar. 2004, pp. 834-836.

(Continued)

*Primary Examiner* — Akm Ullah
(74) *Attorney, Agent, or Firm* — Birch, Stewart, Kolasch & Birch, LLP (57) ABSTRACT

There is disclosed an optical device for dispersion compensation of channels within a predetermined wavelength band, comprising: a waveguiding structure; and a grating structure formed in said waveguiding structure; characterized in that said grating structure has a Bragg frequency profile that is divided into contiguous periods, wherein the Bragg frequencies within each period vary between a lower Bragg frequency and an upper Bragg frequency, said lower and upper Bragg frequencies for each period both corresponding to wavelengths outside of said predetermined wavelength band.

20 Claims, 4 Drawing Sheets

U.S. PATENT DOCUMENTS

| | | | |
|---|---|---|---|
| 7,221,872 B2 * | 5/2007 | Liu et al. | 398/81 |
| 2001/0021294 A1 * | 9/2001 | Cai et al. | 385/37 |
| 2002/0191912 A1 * | 12/2002 | Robinson et al. | 385/37 |
| 2003/0039442 A1 * | 2/2003 | Bond et al. | 385/37 |
| 2003/0072528 A1 * | 4/2003 | Jacobowitz et al. | 385/37 |
| 2003/0147588 A1 * | 8/2003 | Pan et al. | 385/37 |

FOREIGN PATENT DOCUMENTS

WO     WO-96/24079 A1     8/1996

OTHER PUBLICATIONS

Qiang Wu et al., "New Sampling-Based Design of Simultaneous Compensation of Both Dispersion and Dispersion Slope for Multichannel Fiber Bragg Gratings", IEEE Photonics Technology Letters, vol. 17, No. 2, Feb. 2005, pp. 381-383.

Zervas M N et al., "Asymmetrically Apodized Linearly Chirped Fiber Bragg Gratings for Efficient Pulse Compression", Fiber and Integrated Optics, vol. 19, No. 4, Jan. 1, 2000, pp. 355-365, XP-001218156.

Hojoon Lee et al., "Purely Phase-Sampled Fiber Bragg Gratings for Broad-Band Dispersion and Dispersion Slope Compensation", IEEE Photonics Technology Letters, vol. 15, No. 8, Aug. 2003, pp. 1091-1093.

Xi-Hua Zou et al., "Periodically Chirped Sampled Fiber Bragg Gratings for Multichannel Comb Filters", IEEE Photonics Technology Letters, vol. 18, No. 12, Jun. 15, 2006, pp. 1371-1373.

\* cited by examiner

CHANNELIZED DISPERSION COMPENSATION MODULE

TECHNICAL FIELD

The present invention relates generally to the field of wavelength division multiplexed (WDM) systems, and more specifically to an optical device in the form of a grating-based, channelized dispersion compensation module (DCM).

TECHNICAL BACKGROUND

When optical signals are transmitted over optical links, different wavelength components of the optical signals will generally experience different propagation times due to the fact that the transport medium (such as an optical fiber) has different effective refractive indices for different wavelengths. This phenomenon is referred to as dispersion, or chromatic dispersion. One effect of dispersion is that an optical pulse, which always has some finite width in wavelength, will be broadened, since different wavelength components of the pulse will travel at slightly different group velocities through the optical link. Such broadening of optical pulses caused by the dispersion may lead to a situation at the receiver end where it is difficult to separate adjacent pulses from each other during detection. Particularly for high modulation rate systems, dispersion becomes a severely limiting factor. For this reason, it is typically required to use some kind of dispersion compensation along the optical link and/or at the receiver side.

The group velocity $v_g$, i.e. the velocity at which amplitude modulations (signals) travel in a material, is given by $$v_g = \frac{c}{n(\lambda) - \lambda \frac{dn}{d\lambda}} \quad (1)$$

where c is the speed of light in vacuum, n is the wavelength-dependent effective index, and $\lambda$ is the vacuum wavelength. The denominator of this expression is known as the group index $n_g$. The propagation time $\tau$ for a signal over a length L can then be written as $\tau = L \cdot (n_g/c)$. The dispersion is defined as the rate of change of the group propagation time $\tau$ with respect to wavelength $\lambda$, normalized to the propagation length L. Hence, using equation (1) above, the dispersion D is given by:

$$D = \frac{1}{L} \cdot \frac{d\tau}{d\lambda} = -\frac{\lambda}{c} \cdot \frac{d^2 n}{d\lambda^2} \quad [\text{ps} \cdot (\text{km} \cdot \text{nm})^{-1}] \quad (2)$$

If the dispersion is positive, then the high frequency part (short wavelength) of an optical signal will arrive earlier at the receiver side compared to the low frequency part.

As can be seen from the expression (2) above, the dispersion varies with the wavelength range. Optical fibers typically have a wavelength at which the dispersion is zero, called the zero dispersion wavelength, which means that two wavelength channels close to such wavelength have a comparatively small difference in group velocities. For two other wavelength channels, having the same spectral spacing as before but located further away from the zero dispersion wavelength, there will be a considerably larger difference in group velocities. For a typical silica optical fiber used for optical links, the zero dispersion wavelength appears close to 1300 nm. However, attenuation at this wavelength is quite high, and for long-haul communications it is desirable to operate around 1550 nm, where attenuation is considerably lower, but on the other hand dispersion is considerably higher. The zero dispersion wavelength can be shifted by adding dopants to the fiber and/or by altering the core diameter of the fiber, but this introduces other problems.

The dispersion slope in an optical fiber can, for any given wavelength range, be positive or negative. Positive dispersion slope means that the dispersion increases with increasing wavelength, while negative dispersion slope means that the dispersion decreases with increased wavelength.

It is a general desire to keep the total dispersion effects of any optical communications link to a minimum. For example, this could be achieved by combining positive and negative dispersion in the link. If the transport fiber has positive dispersion for the wavelength range at issue, compensation could be effected by passing the optical signal through an additional piece of fiber having negative dispersion, wherein the length and dispersion of the compensating fiber are selected to balance the dispersion effects of the transport fiber. In order to compensate for dispersion in many wavelength channels simultaneously, the dispersion slope of the compensating fiber must also be balanced to the dispersion slope of the transport fiber. An apparent drawback of this approach, however, is that very long compensating fibers are needed, which causes additional problems relating to insertion loss, second order effects, etc.

In order to reduce the required length of the compensating optical fiber, it has previously been proposed to use fiber Bragg gratings in a dispersion compensation module.

One example of a dispersion compensation module (DCM) according to the prior art comprises a long (~10 m), chirped fiber Bragg grating, in which the low frequency part (long wavelengths) of the optical signal is reflected close to the input end of the grating and the high frequency part (short wavelengths) is reflected closer to the opposite end of the grating. The additional propagation path that the high frequency part has to travel across the grating compensates for the difference in propagation time between the low and high frequency parts caused by dispersion in the optical link. For compensation of a standard SMF-28 fiber link over the entire C band, such grating must typically be about 5-10 m long. However, due to the high requirements on the fiber Bragg grating, it becomes very difficult to manufacture such long gratings.

Another approach for making a dispersion compensation module is to use a so-called channelized device, wherein the dispersion is compensated only around the actual channels used in the WDM signal, and not in between the channels. The channels are specified by the ITU grid (International Telecommunication Union) for each of the S-, C-, and L-band. By compensating dispersion only for wavelengths where there might actually be a signal present, the requirement of the grating length can be relaxed considerably. For example, with proper design, the total length of the grating for compensating all channels in the C-band can be reduced to about 0.1-0.2 m for a channelized device.

One straight-forward way of making a grating-based channelized dispersion compensation module is to simply superimpose gratings for all individual channels in the same length of fiber. In theory, this approach is based on the fact that all gratings are spectrally independent, and the optical radiation will interact only with the proper one of all the superimposed gratings. However, when a large number of gratings are superimposed, the available modulation depth for the refractive index in the optical fiber will become saturated. It can be shown that, for N superimposed gratings of equidistant Bragg frequencies, the modulation envelop for all gratings will take a form that resembles a pulse train—the modulation envelop takes on large values in narrow, regularly spaced regions along the grating and zero in between, wherein the peak amplitude for the envelop is N times the peak amplitude for a single grating. For any practical device, the number of gratings that can be superimposed in the same length of optical fiber is therefore limited, because saturation of the refractive index modulation eventually leads to a situation where the refractive index becomes more or less constant along the fiber. In other words, since the available modulation depth in the fiber is limited, refractive index changes will eventually be induced "everywhere" in the fiber up to the available modulation depth (i.e. the modulation becomes severely saturated).

A channelized grating can also be implemented by making a so-called sampled grating. The final grating profile is similar to the overall envelop obtained by superimposing individual gratings according to above, but the sampled grating is obtained by directly determining the grating amplitude rather than by gradually building up the profile by superimposing sub-gratings. It is well known from Fourier mathematics that a periodic modulation of any function creates equidistant side-bands in the spectral domain, where the spectral separation of the side-bands is inversely proportional to the spatial modulation period. Thus, the reflected channels in a sampled grating can be regarded as side-bands induced by the periodic modulation of a fundamental grating. However, also this latter method is limited by the available refractive index modulation depth of optical fibers.

Hence, both for the method of superimposing individual gratings and for the method of sampling a grating to create side-bands, saturation of the photosensitivity in the optical fiber during the process of writing the gratings will limit the available modulation depth. The maximum amplitude that can be obtained in a channelized, superimposed grating is thus a factor N lower than in a continuous dispersion compensating grating. Thereby, the reflection of the grating decreases and the insertion loss of the device increases accordingly. Nonlinear response in the photosensitive fiber may introduce additional degradation.

All prior art approaches according to the above are associated with various drawbacks. For this reason, attempts have been made to devise other types of channelized gratings for dispersion compensation. Spectral side-bands to a function can be created not only by means of a periodic amplitude modulation, but also by means of a periodic phase modulation, or by a combination of the two.

U.S. Pat. No. 6,707,967 discloses a channelized grating created by a phase sampling modulation scheme. Each period of the sampled grating is divided into a number of sub-intervals. In each of these sub-intervals, the phase takes on a constant value, and the phase $\phi$ is restricted to a finite set of $N_s$ allowed values, where $\phi \in \{2\pi k/N_s, k=0, 1, \ldots, N_s-1\}$. The final design parameters are selected by applying a Simulated Annealing algorithm, which optimizes the performance of the device in the available phase space. It turns out that the phase modulation scheme is more efficient than the amplitude modulation scheme, in the sense that the ratio between the maximum amplitude in the N-channel grating and in a corresponding single-channel grating is much smaller than N. This is due to the fact that the amplitude is non-zero everywhere in the grating, in contrast to the amplitude modulation scheme, and that all parts of the grating therefore take part in the interaction with the incoming optical radiation, at least for some frequencies.

However, the phase sampling technique according to U.S. Pat. No. 6,707,967 has some limitations. Since the available phase space is discrete and since the Simulated Annealing algorithm has a finite conversion rate, the overall optimum will not be reached. At best, a local optimum will be obtained. Figure of merits in terms of group-delay ripple, insertion loss variation inside an ITU-grid point window, insertion loss variation between the ITU-grid point windows, spectral width around each ITU-grid point etc. are therefore suboptimal. Moreover, this technique leads to problems when implementing the required, discrete phase jumps, particularly when using phase masks. Even with a perfect phase mask, there will be introduced aberrations due to the distance between the fiber core and the phase mask during fabrication of the gratings.

SUMMARY OF THE INVENTION

Thus, it is an object of the present invention to provide a novel scheme of implementing a channelized grating for compensation of dispersion.

According to the present invention, it is proposed to use a novel phase modulation scheme with a continuous phase function. The shape of the function depends only upon a few free parameters, and the degrees of freedom in the optimization process are therefore much lower than in the phase sampling technique described above. The approach according to the present invention avoids the use of a Simulated Annealing algorithm; the approximate values of the parameters can be estimated from physical principles and can be fine tuned by simple trial-and-error.

In the following description, grating structures will be explained in terms of the Bragg frequency, i.e. the optical frequency that is in resonance with the grating fringes. It will be understood, however, that the Bragg frequency is just a constant times the derivative of the phase. Moreover, as generally known within the art, the chirp of a grating is defined as the rate of change in Bragg frequency with position.

A grating structure for dispersion compensation of channels within a predetermined wavelength band according to the present invention has a Bragg frequency profile that is divided into periods, wherein the Bragg frequencies within each period vary between a lower Bragg frequency and an upper Bragg frequency, said lower and upper Bragg frequencies for each period both corresponding to wavelengths outside of said predetermined wavelength band.

The Bragg frequency profile of the grating structure may advantageously be seen as the sum of a background term corresponding to a chirped background grating and a modulation term, having a monotonically varying Bragg frequency which is reset after each period, corresponding to an added extra chirp. More particularly, the Bragg frequency $f_B(z)$ for the background grating as a function of position in the grating structure may, for example, be expressed as:

$$f_B(z) = f_B(z_0) + \chi_b \cdot (z - z_0) \qquad (3)$$

where z is the longitudinal position in the grating structure, $z_0$ is a reference position in the center of the grating, $f_B(z_0)$ is the Bragg frequency at the reference position, and $\chi_b$, is the chirp rate for the background grating. The channelized grating structure is now obtained by supplementing the background grating, as described by expression (3), by an extra added chirp to obtain the total chirped, periodic Bragg frequency $f_{Btot}$ according to the following:

$$f_{Btot}(z) = f_B(z_0) + \chi_b \cdot (z - z_0) + \chi_e \cdot (z - z_0) - \chi_e \cdot \Lambda \cdot \left\lfloor \frac{z - z_0}{\Lambda} + 0.5 \right\rfloor \quad (4)$$

where $\chi_e$ is the extra chirp rate, $\Lambda$ is the sampling period and $\lfloor . \rfloor$ is the so-called floor function, i.e. $\lfloor x \rfloor$ is the largest integer which is less than or equal to x. Hence, throughout the grating structure, there is a well-defined Bragg frequency as a function of position in the grating. The last term, containing the floor function, has the purpose of resetting the Bragg frequency after each period, such that the total Bragg frequency within each period spans from a lower Bragg frequency to an upper Bragg frequency, wherein both the lower and the upper Bragg frequencies correspond to wavelengths outside of the wavelength band for which dispersion compensation is sought.

It is known per se that the pitch of the grating, i.e. the physical distance between the grating fringes, can be evaluated from the Bragg frequency by $$\Lambda = \frac{2 \cdot n(\lambda) \cdot c_0}{f_B} \quad (5)$$

where $c_0$ is the speed of light in vacuum, n is the effective index of the optical mode, and $\lambda$ is the wavelength of the radiation. It can be shown that the dispersion of the effective index has a negligible influence on spectral response from the channelized grating, and in most practical cases, expression (5) can be approximated to $$\Lambda = \frac{2 \cdot n(\lambda_0) \cdot c_0}{f_B} \quad (6)$$

where $\lambda_2$ is the wavelength at the center of the wavelength band in which the channelized device operates.

The phase of the fringes as a function of position in the grating structure can then be written as:

$$\Phi(z) = \int_0^z \frac{2\pi}{\Lambda(\varsigma)} d\varsigma = \int_0^z \frac{\pi \cdot f_B(\varsigma)}{n(\lambda_0) \cdot c_0} d\varsigma \quad (7)$$

It can thus be seen that the inventive scheme employs a continuous phase function for determining the grating structure of the channelized device.

In other words, according to the present invention, a sampled grating for dispersion compensation may be seen as having a chirped background grating which is modulated in order to create side-bands. The side-bands are typically created such that they correspond to the ITU grid for WDM systems. The modulation of the background grating is accomplished by a continuous phase modulation wherein the background grating is divided into periods, and wherein the chirp of the background grating is supplemented by an extra chirp, such that each period has Bragg frequencies ranging from a Bragg frequency below the wavelength band at interest to a Bragg frequency above the wavelength band at interest. In this manner, each channel within the wavelength band at interest will correspond to a Bragg frequency at least somewhere in each period.

Notably, the inventive scheme does not involve any superposition of gratings. Rather, the background grating referred to is used as a starting point for calculating the final grating structure profile to be written into the waveguiding structure. The Bragg frequency profile of the final grating structure is calculated by adding the extra chirp to the background grating and resetting the added Bragg frequency resulting from the extra chirp after each period, and the final grating structure is directly written into the waveguiding structure by techniques known per se. For example, the grating structure may be written into the waveguiding structure, preferably the core of an optical fiber, using the techniques disclosed in "*Fabrication of advanced fibre Bragg gratings by use of sequential writing with a continuous-wave ultraviolet laser source*", by I. Petermann et al., Appl. Opt. 41, 1051-1056 (2002).

BRIEF DESCRIPTION OF THE DRAWINGS

In the detailed description below, reference will be made to the accompanying drawings, on which FIG. 1 schematically shows Bragg frequency as a function of position along the inventive grating structure for an exemplary, sampled 10-period grating.

It should be understood that the examples given in the figures are for illustrative purposes only. For example, any sampled channelized grating structure according to the present invention will typically be designed for a considerably larger number of periods than 10. It should also be noted that Bragg frequencies and positions along the grating structure are shown in relative terms only, and that all magnitudes shown in the figures are generally exaggerated.

DETAILED DESCRIPTION

A grating structure for dispersion compensation according to the pre sent invention is based upon modulation of a background profile (background grating), where the background profile is typically a single-channel grating of standard design for the center channel within the wavelength band at interest. The Bragg frequency of the background profile is varied gradually with position along the grating. The rate of change in the Bragg frequency is called the chirp of the grating, as generally known within the art.

The amplitude of the background profile (i.e. its amplitude modulation) may preferably be apodized, which means that the modulation amplitude is gradually increasing at the beginning of the orating and gradually decreasing at the end of the grating, in order to reduce ripple in the spectral domain. This kind of apodization is per se known in the art, and need not be described in detail here.

According to the present invention, an extra chirp is added to the background grating, i.e. to the chirp that defines the single-channel grating used as a starting point for calculation of the channelized grating. However, since the modulation should be periodic, the increment of the Bragg frequency due to the extra chirp is reset periodically. In effect, the Bragg frequency profile as a function of position along the inventive grating structure written into the waveguiding structure will have a slanting saw-tooth profile, where the background grating provides the overall slope for the saw-tooth profile, and where the extra chirp in each period varies from a lower limit to an upper limit.

The extra added chirp thus leads to a grating structure having a Bragg frequency profile that is divided into periods, wherein the Bragg frequencies within each period vary, preferably in a linear fashion, between a lower Bragg frequency and an upper Bragg frequency, said lower and upper Bragg frequencies for each period both corresponding to wavelengths outside of the wavelength band at issue for dispersion compensation.

When designing and producing a dispersion compensation module according to the present invention, a background profile suitable for dispersion compensation of one channel within a predetermined wavelength band is first determined. To this background profile, an extra chirp is added such that an aggregate grating profile is obtained. This aggregate grating profile is divided into periods and the Bragg frequency of this aggregate grating profile is reset after each period such that Bragg frequencies within each period vary, preferably in a linear fashion, between a lower Bragg frequency and an upper Bragg frequency, said lower and upper Bragg frequencies for each period both corresponding to wavelengths outside of the wavelength band at issue for dispersion compensation. The thus obtained aggregate grating profile is then written into a photosensitive waveguiding structure, such as an optical fiber.

Figure 1:
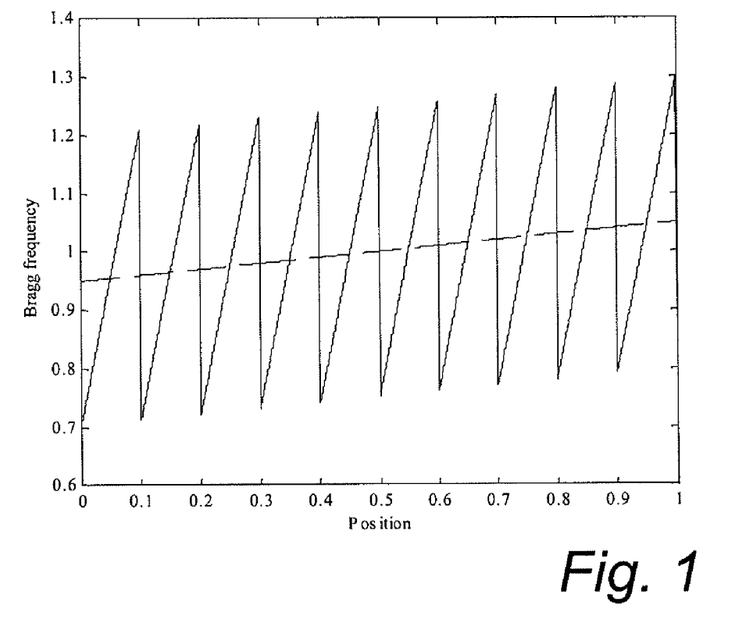

The resulting grating structure written into the waveguiding structure is shown in FIG. 1 in terms of Bragg frequencies. As a simplified and illustrative example, FIG. 1 shows a grating structure having 10 periods. The dashed line in FIG. 1 corresponds to the Bragg frequencies of the background profile. It should be noted that the background profile itself is not written into the waveguiding structure, but only serves as a suitable starting point for calculating the final grating structure. In this case, the background profile corresponds to a chirped grating for dispersion compensation of a center channel within the wavelength band at issue.

In each period, the chirp of the background profile is supplemented by an added extra chirp. The addition to the Bragg frequency caused by the added extra chirp is reset after each period such that a lower Bragg frequency and an upper Bragg frequency for each period correspond to wavelengths outside of the predetermined wavelength band for which the grating structure is designed. Hence, each channel within the predetermined wavelength band will correspond to a Bragg frequency at least somewhere along the chirp within each period of the grating structure.

The extra chirp added to the background profile and the resetting of Bragg frequencies after each period thus constitute a phase modulation of the background profile, leading to the creation of side-bands. As mentioned in the introduction above, the spectral separation between the side-bands is inversely proportional to the spatial modulation period. Hence, the closer the ITU channels are packed, the longer should the modulation (sampling) period be.

The figure-of-merit for the sampled grating can be further improved by apodizing not only the background profile, but also the index profile within each period. Since the present invention provides a scheme in which, for each position along the grating structure, there is a well-defined corresponding wavelength, it becomes possible to apply periodic apodization. This has not been possible in prior art approaches. The periodic apodization should be periodic with the same period as the phase function, i.e. as the Bragg frequency. In order to reduce the variation in reflection for different channels, the amplitude over each period should preferably be gradually switched on and off in a similar manner as for the background grating. If this apodization of the modulation is not present, the reflection—and thereby the insertion loss—may fluctuate for the lowest and the highest frequency channels.

Moreover, the central channels within the wavelength band at issue typically have a higher reflection than the channels at the ends of the band. This can be compensated for by introducing also an apodization within each period. Such apodization is preferably a second-order apodization. By lowering the grating amplitude at the center frequencies in this manner, substantially equal reflection can be obtained for all channels.

Figure 2:
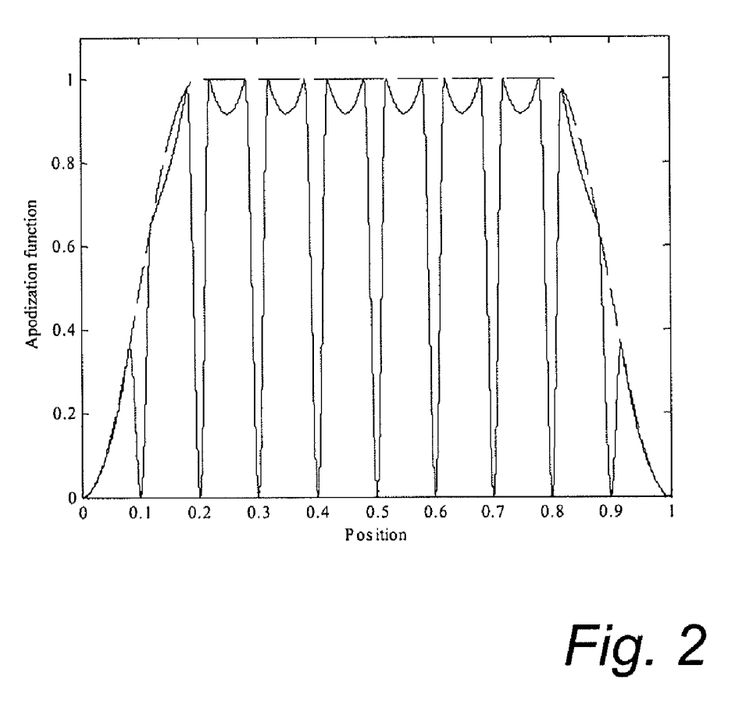
FIG. 2 schematically shows an apodization function for the exemplary, sampled 10-period grating.

FIG. 2 shows an exemplary apodization profile for the 10-period grating structure of FIG. 1. The dashed line in FIG. 2 corresponds to the apodization function for the background grating. However, the present invention provides for the possibility of introducing periodic apodization, wherein the index profile in each period is similarly apodized. Thus, the solid line of FIG. 2 illustrates the actual apodization for the sampled channelized grating structure of FIG. 1. As can be seen from FIG. 2, the amplitude modulation within each period is gradually switched on and off at the end-points of each period. Moreover, and as also seen in FIG. 2, the central portion of each period, corresponding to center channels within the wavelength band at issue, can be given a second order apodization. In FIG. 2, this is shown as a slightly lowered modulation amplitude in the central portion of each period. As stated above, this second order apodization has the effect of equalizing the overall reflection for all channels.

Again, it should be noted that both the background grating and the sample period have Bragg frequencies that are gradually increasing with position. This means that standard profiles for the apodization functions can be applied both for the overall apodization envelop and for the periodic apodization. Compared to the prior art phase modulation scheme as disclosed in U.S. Pat. No. 6,707,967 this is a considerable advantage. In the prior art scheme, any given point in the sampling period is not associated with any particular optical frequency, and a very complicated amplitude sampling modulation scheme would be required in order to find the appropriate apodization profile. On the contrary, in the approach according to the present invention, every point in the sampled grating is associated with a well-defined optical frequency, which makes it straight forward to apply apodization according to the above.

When a grating profile determined according to the above is written into a waveguiding structure such as an optical fiber, it is possible to provide a channelized dispersion compensating module (DCM) where the side-bands formed by the periodic modulation are positioned at the grid points of the ITU grid. However, since all the side-bands are more or less equivalent, the dispersion compensation in units of ps/GHz is approximately constant over the sampled grating. In order to take care of situations where the dispersion varies between the channels, it would be beneficial to be able to add a dispersion slope to the grating. In order to do so, it is here proposed to use a quasi-periodic modulation function rather than a perfectly periodic one, such that the symmetry between the side-bands is broken.

Figure 3:
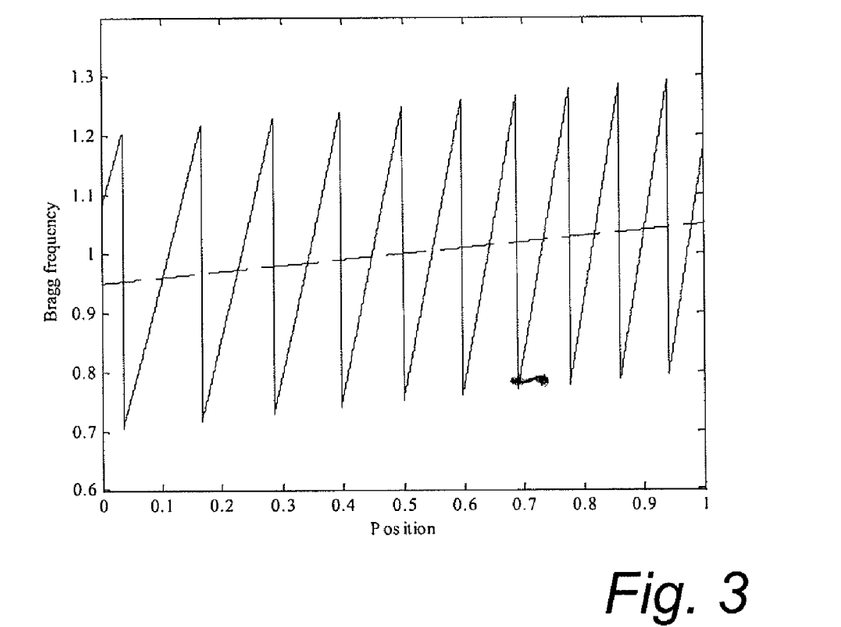
FIG. 3 schematically shows Bragg frequency as a function of position along the inventive grating structure for an exemplary, sampled 10-period grating having a quasi-periodic modulation.

Such quasi-periodic modulation is introduced by varying the sampling period along the grating. The total increment in Bragg frequency over each period (i.e. the extra added chirp)

is still the same as before, i.e. typically spanning at least the wavelength band of interest. An exemplary grating structure is illustrated in FIG. 3, where the sampling period is seen to decrease along the grating structure. However, within each period of the sampled grating structure, the Bragg frequencies still span over the entire wavelength band. FIG. 3 shows a situation similar to that of FIG. 1, but now using the proposed quasi-periodic sampling period.

When the quasi-periodic modulation according to the above is employed, it turns out that a linear slope is added to the reflection as a function of channel number (wavelength). However, this slope can be eliminated by manipulating the linear term in the function (second-order polynomial) that describes the apodization function in each sample period.

Figure 4:
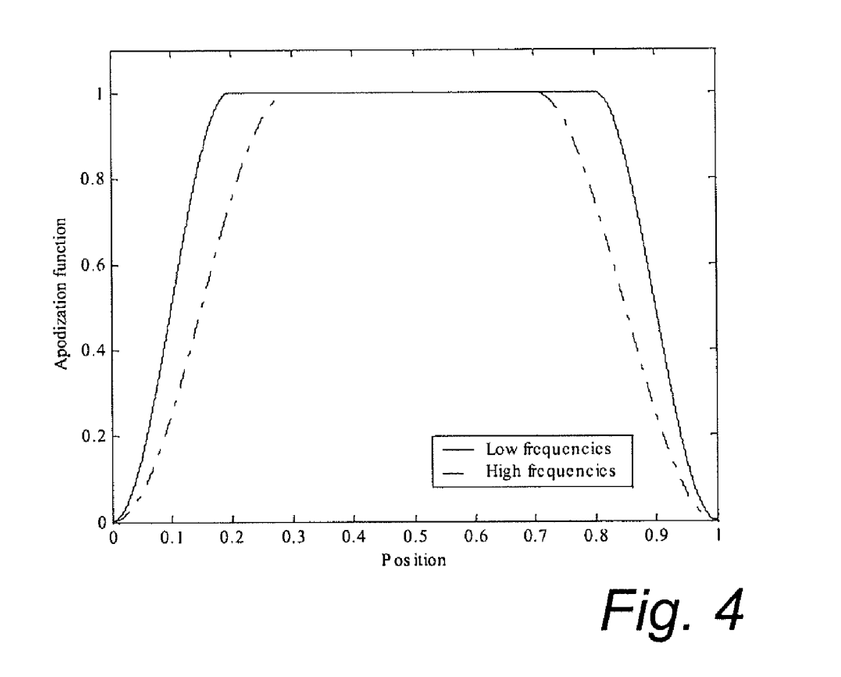
FIG. 4 schematically illustrates optimum apodization profiles of the background grating for different Bragg frequencies.

In addition, the quasi-periodic modulation causes the frequency window around the different wavelength channels to vary with the channel number. This can be handled by introducing a frequency dependent apodization of the background grating. To illustrate how this is accomplished, reference is made to FIG. 4. Assume that the most beneficial apodization profile for the background grating follows the solid line in FIG. 6 for the lowest frequencies in the wavelength band, and that the most beneficial apodization profile follows the dash-dotted line for the highest frequencies in the wavelength band. It will be understood that corresponding curves for all intermediate frequencies between the lowest and highest frequencies form a manifold of similar curves, where the Bragg frequency is a parameter deciding the respective curve. Now, to determine the apodization factor at any position in the background grating, one may compare with the curve in the manifold corresponding to the same Bragg frequency at that position, and take the functional value at that position for this curve in the manifold. In other words, the appropriate apodization factor at any position in the grating is the functional value at the relevant grating position for the curve in the manifold that is associated with the same Bragg frequency as the grating Bragg frequency at that grating position. It should be understood that the apodization for the background grating determined in this manner corresponds to the overall apodization envelop indicated in FIG. 2 by the dashed line.

In order to further improve the performance of a device according to the present invention, it is also proposed to use asymmetrical apodization. It turns out that the inventive modulation scheme used in connection with the present invention breaks the symmetry between low- and high-frequency components; if the reflection and group-delay ripple are plotted as functions of frequency for a channel, these curves will not be perfectly symmetrical around the carrier frequency. This means that, for example, the ripple on the low-frequency side may be larger and require stronger filtering and hence a smoother apodization profile than on the high-frequency side. It is not possible to find a symmetrical apodization profile that makes an optimum trade-off between the ripple and the steepness of the flanks on both the high- and the low-frequency side of the reflection spectrum.

In a device having negative dispersion, the low-frequency flank of the spectral response around each channel corresponds to the beginning of the modulated background grating, and the high-frequency flank corresponds to the end. Asymmetrical apodization according to the above means that the background grating apodization envelope is different at the two ends of the grating. Typically, the gradual increase of the background grating envelope at the beginning is slower—which implies a stronger filtering—than the gradual decrease at the end.

Figure 5:
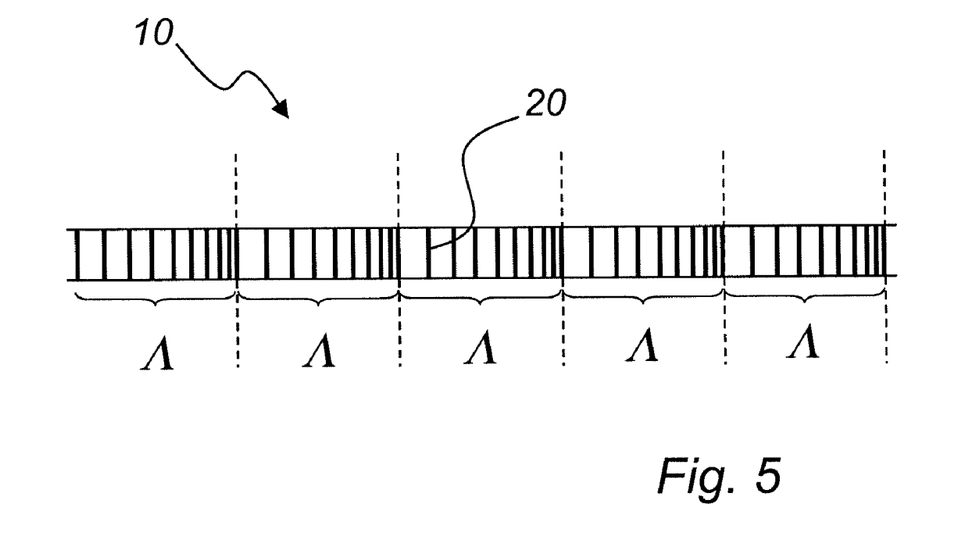
FIG. 5 schematically shows the refractive index variation along a grating structure according to the present invention.

It may also be useful to understand how the actual refractive index modulation of the inventive grating structure looks. To this end, reference is made to FIGS. 5 and 6 of the accompanying drawings. In FIG. 5, the refractive index modulation is schematically shown for a sampled grating having a constant sampling period $\Lambda$. Only 5 periods are shown in FIG. 5, but it will be understood that a considerably higher number of periods will be used for an actual implementation of the inventive scheme. The refractive index modulation basically comprises a contiguous series of chirped grating periods, wherein each period has Bragg frequencies in the chirp corresponding to all wavelengths within the wavelength band at issue. Hence, the present invention does not involve a simple cascading of channel-specific gratings, but rather a true phase modulation wherein all periods affect all channels within the wavelength band. Nevertheless, the sampling scheme according to the present invention provides for a well-defined Bragg frequency at each location throughout the grating structure.

Figure 6:
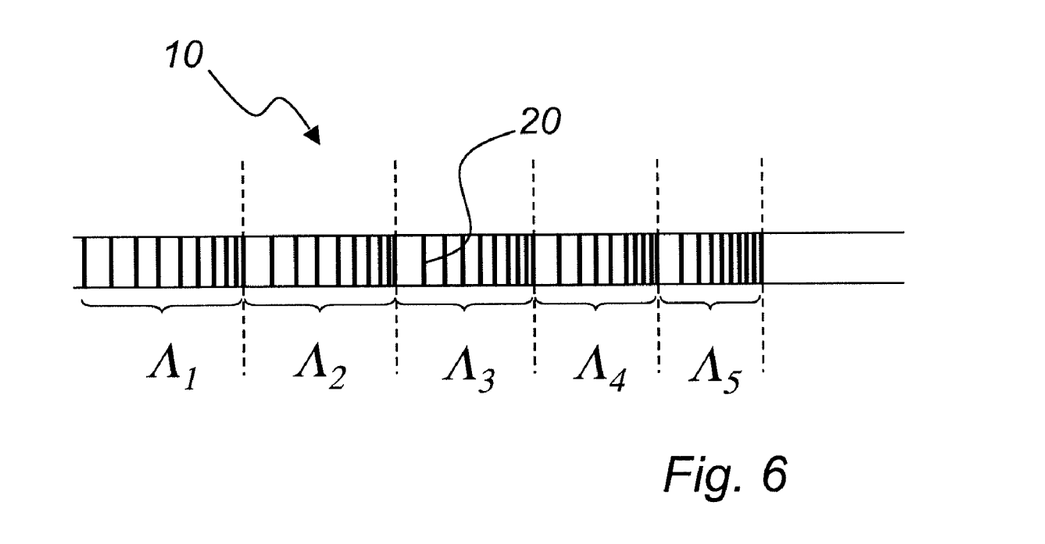
FIG. 6 schematically shows the refractive index variation along a grating structure according to the present invention having a quasi-periodic modulation.

FIG. 6 shows a similar grating structure as FIG. 5, but for an implementation using quasi-periodic sampling according to the above. The sampling period $\Lambda_n$ now successively decreases along the grating structure, such that $\Lambda_1 < \Lambda_2 < \Lambda_3 < \Lambda_4 < \Lambda_5$.

In order to further improve the performance of the device according to the present invention, it is also proposed to use a chirp reduction at both ends of the grating. Typically, the background grating profile that is modulated has a nearly linearly increasing Bragg frequency over the entire grating. In order to reduce the ripple at the edges of the allowed spectral window around each channel, the background grating amplitude envelope is apodized as described above. It should be noted, however, that the frequency is chirped at both ends of the grating, in spite of the fact that the spectral components that nominally are reflected in these regions are outside the spectral region of interest for the device.

In this context, it should be noted that apodization of chirped gratings has some complications compared to the apodization of non-chirped gratings. If the chirp is large—which typically is the case for a channelized dispersion compensation module having a small dispersion—the apodization flanks contain a large range of spectral components, even if these flanks are comparatively short. Radiation is reflected in a similar way as in an non-chirped grating without apodization: many spectral components are reflected over a short distance, i.e. a broadband type of reflection. This analogy suggests that it is the large slope in the Bragg frequency in the apodization flanks that is the main source of ripple at the edges of the spectral window around each channel. It is therefore proposed that the variation in the spectral response of the channelized dispersion compensation module can be reduced, by gradually switching off the chirp at both ends of the background grating profile. In other words, the chirp of the background grating takes on its maximum value close to the center of said background grating, and gradually decreases toward the edges of said background grating. In order to avoid strong narrowband reflection in regions of the grating having a low chirp, it is preferred to synchronize the amplitude apodization and the Bragg frequency function; the amplitude envelope should preferably take on small values in regions where the chirp is small.

In an actual implementation of the present invention, an optical device in the form of a grating-based, channelized dispersion compensation module (DCM) was designed for compensation of the dispersion caused by an 80 km long standard SMF 28 fiber link. The channelized DCM according to this implementation of the invention was 95 mm long, and was designed to cover 50 ITU channels in the C-band having a 100-GHz spacing. The chirp of the background profile was 951 MHz/mm. The background profile as apodized at both ends, where the amplitude of the grating increased from zero to its final value over a distance of 12 mm. The sampling period generally depends upon the exact group index of the photosensitive optical fiber in which the grating structure is written, but was for this implementation estimated to 1.015 mm. The additional added extra chirp was 11 THz/mm. The Bragg frequency at the center of the central sampling period in the grating was set to 194 THz, which roughly corresponds to the center of the C-band. This means that the Bragg frequency over one sampling period typically varied from 188.5 THz (well below the C-band) to 199.5 THz (well above the C-band). Each sampling period was also apodized: the amplitude of the grating increased from zero to its maximum value over 200 μm; in addition a second-order polynomial apodization was used, so that the amplitude in the low-frequency part of the sampling period was about 10% lower than in the high-frequency part, and the amplitude in the center was about 20% lower than in the high frequency part. The sampling period decreased by about 36 ppm per period, which means that the sampling period at the end of the grating structure was about 0.35% shorter than at the beginning of the grating structure. The additional extra added chirp was increased by the same amount each period, so that the Bragg frequency increment over one period due to the additional chirp was constant throughout the grating structure.

Although the description above has been given by mainly reference to optical fibers, it should be clear that the inventive concept may be implemented also in other kinds of waveguiding structures, such as in a planar or buried waveguide. Generally, the present invention is not restricted to any particular kind of waveguiding structure for its implementation.

As will be readily understood, an optical device for dispersion compensation, i.e. a dispersion compensation module, according to the present invention will include a waveguiding structure and a grating structure as disclosed herein formed in said waveguiding structure. The waveguiding structure is preferably an optical fiber.

Figure 7:
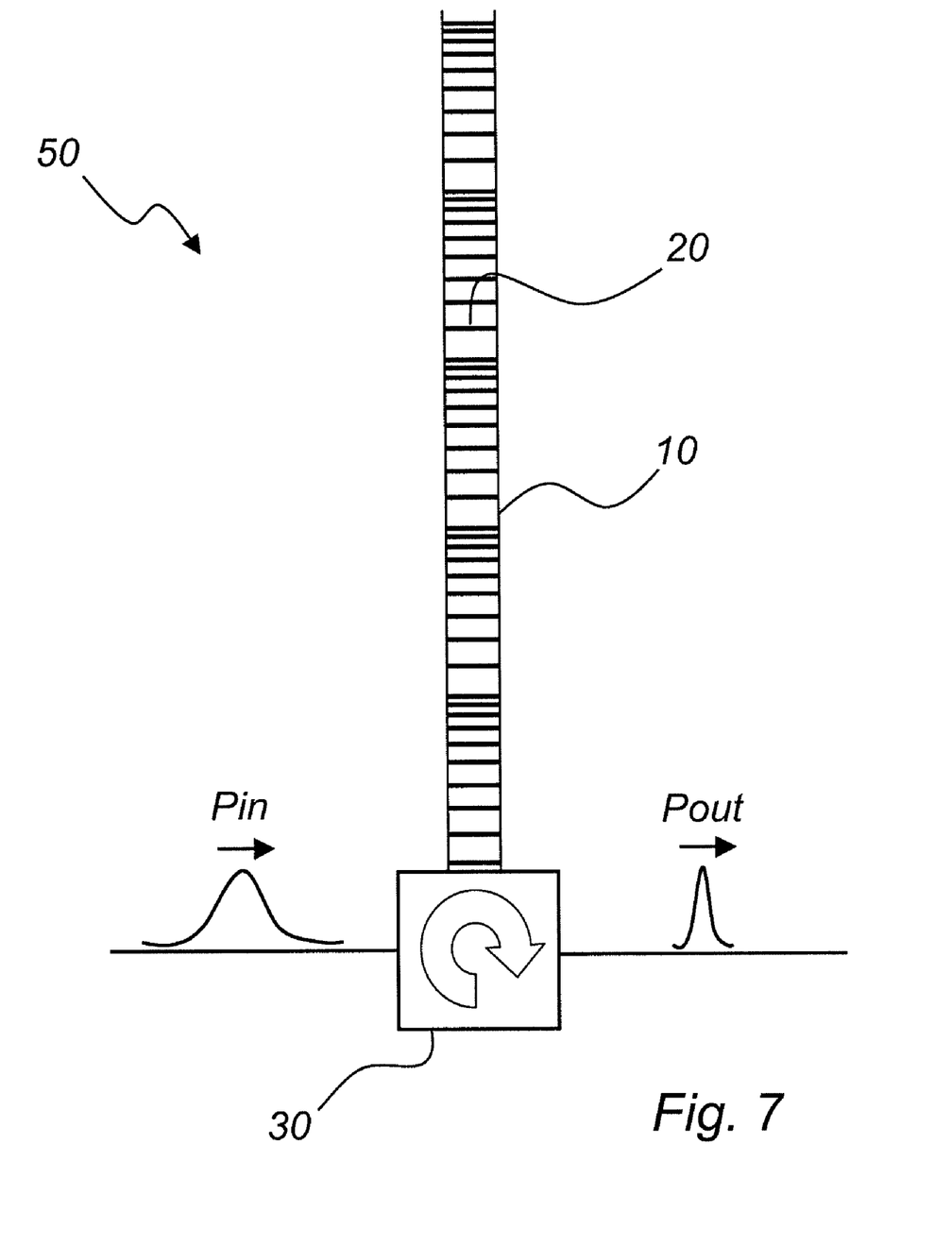
FIG. 7 schematically shows an arrangement for dispersion compensation including a three-port optical circulator.

FIG. 7 shows schematically how a dispersion compensation module according to the present invention can be implemented. In FIG. 7, there is shown an arrangement 50, in which the waveguiding structure 10, containing the grating structure 20, is coupled to a three-port optical circulator 30. A broadened optical pulse $P_{in}$ in incident through a first port of the optical circulator 30. The incident pulse is then directed to a second port of the circulator and passed through the inventive grating structure for providing the dispersion compensation. The dispersion compensated (compressed) pulse reflected from the grating structure 20 is finally directed to a third port of the circulator and output for subsequent processing.

Conclusion

An improved and inventive scheme for making a sampled, channelized grating structure for dispersion compensation has been disclosed. An optical device for dispersion compensation of channels within a predetermined wavelength band comprises a waveguiding structure and a grating structure formed in said waveguiding structure. The inventive grating structure has a Bragg frequency profile that is divided into periods, wherein the Bragg frequencies within each period vary between a lower Bragg frequency and an upper Bragg frequency, said lower and upper Bragg frequencies for each period both corresponding to wavelengths outside of said predetermined wavelength band. Hence, the grating structure according to the present invention is based upon a scheme that avoids both superposition of individual gratings and amplitude modulation, thus virtually eliminating problems relating to saturation of the refractive index modulation in the waveguiding structure. In addition, since the inventive grating structure has a well-defined Bragg frequency for each location, efficient apodization methods can be applied in order to improve the optical performance.

The invention claimed is:

1. An optical device for dispersion compensation of wavelength division multiplexed channels within a predetermined wavelength band, comprising:
   a waveguiding structure; and
   a grating structure formed in said waveguiding structure; characterized in that
   said grating structure has a Bragg frequency profile that is divided into contiguous periods, wherein the Bragg frequencies within each period vary between a lower Bragg frequency and an upper Bragg frequency, said lower and upper Bragg frequencies for each period both corresponding to wavelengths outside of said predetermined wavelength band,
   wherein the Bragg frequency profile of the grating structure is a sum of a background profile corresponding to a chirped background grating designed for dispersion compensation of one channel within said wavelength band, and a modulation profile having a monotonically varying Bragg frequency, which is reset after each period, corresponding to an extra chirp added to the background profile such that the total increment in Bragg frequency over each period is spanning at least said predetermined wavelength band, and
   wherein said contiguous periods have a gradually varying length along the grating structure in order to add a dispersion slope to the grating structure, and wherein a frequency dependent apodization is introduced to compensate for variations, caused by the varying period length, in the frequency window for different channels within said predetermined wavelength band.

2. The optical device of claim 1, wherein the Bragg frequencies within each period vary linearly between the lower Bragg frequency and the upper Bragg frequency.

3. The optical device of claim 1, wherein the chirp of the background grating takes on its maximum value close to the center of said background grating, and gradually decreases toward the edges of said background grating.

4. The optical device of claim 1, further comprising an apodization which involves a second order apodization that provides a lower reflection for channels in the center of the predetermined wavelength band compared to channels at the edges of said wavelength band, in order to provide substantially equal reflection for all channels.

5. The optical device of claim 1, wherein the chirped background grating is asymmetrically apodized, such that the apodization envelope is different at the two sides of said background grating.

6. The optical device of claim 1, wherein the waveguiding structure is an optical fiber.

7. The optical device of claim 6, wherein the grating structure is written into a core of the optical fiber.

8. A method of producing a dispersion compensation module for wavelength division multiplexed channels within a predetermined wavelength band, comprising the steps of:
   determining a background profile corresponding to a chirped background grating suitable for dispersion compensation of one channel within said predetermined wavelength band;
   adding to said background profile an extra chirp to obtain an aggregate grating profile,
   dividing the aggregate grating profile into periods; and
   shifting the Bragg frequency of said aggregate grating profile after each period such that Bragg frequencies within each period vary between a lower Bragg frequency and an upper Bragg frequency, said lower and upper Bragg frequencies for each period both corresponding to wavelengths outside of said predetermined wavelength band; and writing the resulting aggregate grating profile into a photosensitive waveguiding structure.

9. The method of claim 8, wherein the step of dividing the aggregate grating profile into periods is performed such that said periods have a gradually varying length along the grating structure in order to add a dispersion slope to the grating structure, and further comprising the step of introducing a frequency dependent apodization to compensate for variations, caused by the varying period length, in the frequency window for different channels within said predetermined wavelength band.

10. The method of claim 9, wherein the frequency dependent apodization is introduced by the following steps:

determining a manifold of apodization profile curves, each curve in said manifold corresponding to a desired apodization profile for one frequency within the predetermined wavelength band; and for each position in the grating structure, taking as an apodization factor the functional value, at that position, for the curve in the manifold corresponding to the same Bragg frequency as the grating Bragg frequency at that position in the grating structure.

11. The method of claim 8, wherein the resulting grating profile is written into an optical fiber.

12. The method of claim 11, wherein the resulting grating profile is written into a core of the optical fiber.

13. The optical device of claim 2, wherein the chirp of the background grating takes on its maximum value close to the center of said background grating, and gradually decreases toward the edges of said background grating.

14. The optical device of claim 2, further comprising an apodization which involves a second order apodization that provides a lower reflection for channels in the center of the predetermined wavelength band compared to channels at the edges of said wavelength band, in order to provide substantially equal reflection for all channels.

15. The optical device of claim 3, further comprising an apodization which involves a second order apodization that provides a lower reflection for channels in the center of the predetermined wavelength band compared to channels at the edges of said wavelength band, in order to provide substantially equal reflection for all channels.

16. The optical device of claim 2, wherein the chirped background grating is asymmetrically apodized, such that the apodization envelope is different at the two sides of said background grating.

17. The optical device of claim 3, wherein the chirped background grating is asymmetrically apodized, such that the apodization envelope is different at the two sides of said background grating.

18. The optical device of claim 4, wherein the chirped background grating is asymmetrically apodized, such that the apodization envelope is different at the two sides of said background grating.

19. The optical device of claim 2, wherein the waveguiding structure is an optical fiber.

20. The optical device of claim 3, wherein the waveguiding structure is an optical fiber.

* * * * *